United States Patent
Elias et al.

(10) Patent No.: US 10,926,650 B2
(45) Date of Patent: Feb. 23, 2021

(54) CHARGING DEVICE FOR INDUCTIVELY CHARGING AN ELECTRICAL ENERGY STORE OF A MOTOR VEHICLE AND METHOD FOR OPERATING A CHARGING DEVICE

(71) Applicant: AUDI AG, Ingolstadt (DE)

(72) Inventors: Björn Elias, Hepberg (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 260 days.

(21) Appl. No.: 15/574,248

(22) PCT Filed: May 12, 2016

(86) PCT No.: PCT/EP2016/060732
§ 371 (c)(1),
(2) Date: Nov. 15, 2017

(87) PCT Pub. No.: WO2016/184780
PCT Pub. Date: Nov. 24, 2016

(65) Prior Publication Data
US 2018/0236880 A1    Aug. 23, 2018

(30) Foreign Application Priority Data
May 16, 2015   (DE) .................... 10 2015 006 307.3

(51) Int. Cl.
*H02J 7/00*   (2006.01)
*H02J 7/14*   (2006.01)
(Continued)

(52) U.S. Cl.
CPC ............ *B60L 53/12* (2019.02); *B60L 11/182* (2013.01); *B60L 53/38* (2019.02); *Y02T 10/70* (2013.01);
(Continued)

(58) Field of Classification Search
USPC ........................................................ 320/108
See application file for complete search history.

(56) References Cited

U.S. PATENT DOCUMENTS 5,248,215 A    9/1993  Fladung
5,654,621 A *  8/1997  Seelig ..................... H01F 38/14
                                                320/108
(Continued)

FOREIGN PATENT DOCUMENTS

CN    101933212 A    12/2010
CN    102741083 A    10/2012
(Continued)

OTHER PUBLICATIONS

Examination Report dated of corresponding German application No. 10 2015 006 307.3; 7 pgs.
(Continued)

*Primary Examiner* — Alexis B Pacheco
(74) *Attorney, Agent, or Firm* — Maier & Maier, PLLC

(57) ABSTRACT

A charging device for inductively charging an electrical energy store of a motor vehicle, having a primary coil, which is designed for inducing a voltage in a secondary coil of the motor vehicle for charging the electrical energy store, and having a lifting mechanism which is designed to move the primary coil between a stowage position and a charging position. A power electronics of the charging device is coupled in heat-conducting manner to the lifting mechanism.

7 Claims, 1 Drawing Sheet

(51) Int. Cl.
  *B60L 53/12* (2019.01)
  *B60L 53/38* (2019.01)
  *B60L 11/18* (2006.01)

(52) U.S. Cl.
  CPC ............ *Y02T 10/7072* (2013.01); *Y02T 90/12* (2013.01); *Y02T 90/14* (2013.01)

(56) References Cited

U.S. PATENT DOCUMENTS

| | | | | |
|---|---|---|---|---|
| 5,821,731 | A * | 10/1998 | Kuki | H02J 7/0045 320/108 |
| 6,676,122 | B1 | 1/2004 | Wobben | |
| 8,946,938 | B2 * | 2/2015 | Kesler | H02J 50/90 307/104 |
| 2009/0011616 | A1 * | 1/2009 | Patwardhan | H01R 13/629 439/34 |
| 2010/0308768 | A1 | 12/2010 | Dower | |
| 2011/0181240 | A1 * | 7/2011 | Baarman | B60L 53/65 320/108 |
| 2011/0199047 | A1 | 8/2011 | Fujii | |
| 2012/0161696 | A1 | 6/2012 | Cook et al. | |
| 2012/0203410 | A1 | 8/2012 | Wechlin et al. | |
| 2013/0037365 | A1 * | 2/2013 | Ichikawa | B60L 11/1829 191/10 |
| 2013/0249470 | A1 * | 9/2013 | Martin | B60L 53/36 320/107 |
| 2014/0070767 | A1 | 3/2014 | Morris et al. | |
| 2014/0084697 | A1 * | 3/2014 | Yasuda | H02J 7/025 307/104 |
| 2014/0183966 | A1 | 7/2014 | Suzuki et al. | |
| 2015/0364924 | A1 * | 12/2015 | Yuasa | |
| 2016/0280084 | A1 * | 9/2016 | McGrath | B60L 53/32 |
| 2016/0332505 | A1 * | 11/2016 | Yamanaka | B60H 1/143 |
| 2017/0080815 | A1 * | 3/2017 | Wechsler | B60L 11/1829 |
| 2017/0129345 | A1 * | 5/2017 | Wechsler | B60L 53/302 |

FOREIGN PATENT DOCUMENTS

| | | | |
|---|---|---|---|
| CN | 102917907 A | 2/2013 | |
| DE | 2434890 B1 | 11/1975 | |
| DE | 4236286 A1 | 5/1994 | |
| DE | 10000370 A1 | 7/2001 | |
| DE | 10258610 A1 | 6/2004 | |
| DE | 102009033235 A1 | 1/2011 | |
| DE | 102011118397 A1 | 5/2012 | |
| DE | 102011076186 A1 | 11/2012 | |
| DE | 102012208005 A1 | 11/2013 | |
| DE | 102013100019 A1 | 7/2014 | |
| EP | 2858079 A1 | 4/2015 | |
| EP | 3110656 B1 * | 6/2019 | ............ H02J 50/90 |
| FR | 2785307 A1 | 5/2000 | |
| WO | 2010098412 A1 | 9/2010 | |
| WO | 2011079215 A2 | 6/2011 | |
| WO | 2013081542 A1 | 6/2013 | |
| WO | WO-2015128498 A1 * | 9/2015 | ............ H01J 50/90 |

OTHER PUBLICATIONS

International Search Report dated of corresponding International application No. PCT/EP2016/060732; 18 pgs.
English translation of International Preliminary Report on Patentability dated Nov. 30, 2017 of corresponding International application No. PCT/EP2016/060732; 8 pgs.
Office Action dated Sep. 20, 2019, in corresponding Chinese Application No. 201680028131.8 including partial machine-generated English language translation; 10 pages.

* cited by examiner

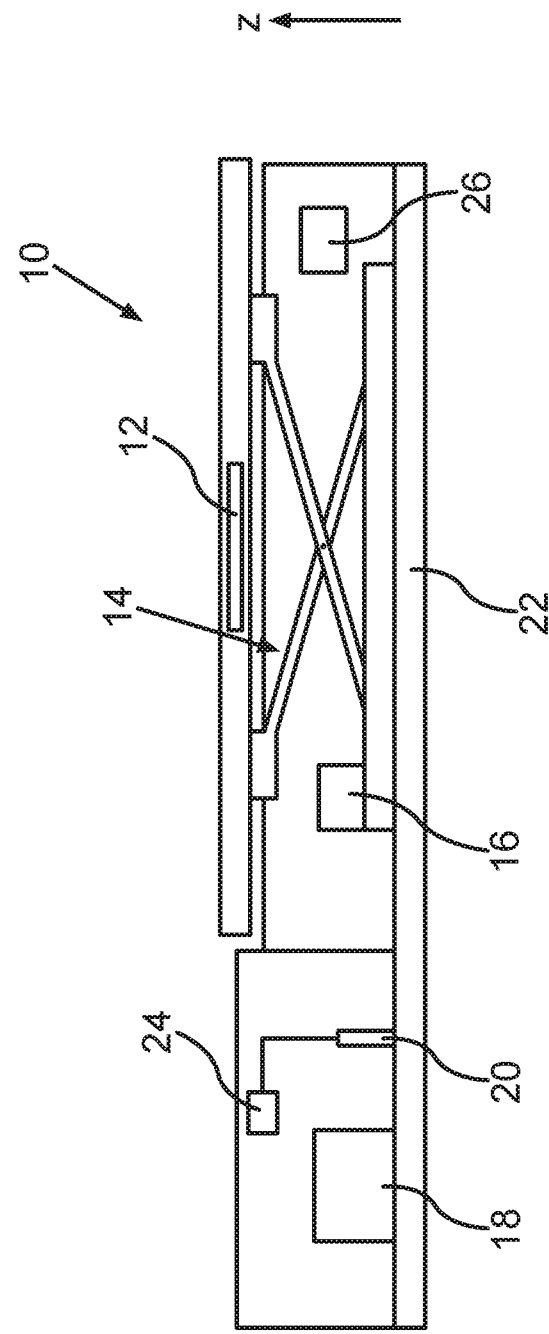

CHARGING DEVICE FOR INDUCTIVELY CHARGING AN ELECTRICAL ENERGY STORE OF A MOTOR VEHICLE AND METHOD FOR OPERATING A CHARGING DEVICE

FIELD

The invention relates to a charging device for inductively charging an electrical energy store of a motor vehicle. Furthermore, the invention relates to a method for operating such a charging device.

BACKGROUND

DE 2 434 890 B1 shows a device of a charging apparatus arranged in a motor vehicle with an alternating or direct current network. The device comprises a coupling surface, in whose region primary windings of the device are arranged. Secondary windings of a motor vehicle can be placed in proximity to the coupling surface in order to charge a battery of the motor vehicle. In this way, components generating electrical waste heat can be provided in the region of the coupling surface in order to keep the coupling surface free of ice in the winter.

US 2012/0161696 A1 shows a charging device for the inductive charging of an electrical energy store of a motor vehicle. The charging device comprises a primary coil, which is adapted to induce a voltage in a secondary coil of the motor vehicle for the charging of the electrical energy store. Furthermore, the charging device comprises a lifting mechanism, which is adapted to move the primary coil between a stowage position and a charging position.

DE 10 2009 033 235 A1 shows a similar charging device for inductively charging an electrical energy store of a motor vehicle with a primary coil and a lifting mechanism for lifting and lowering the primary coil.

In charging devices with such a lifting mechanism, problems may occur with the lifting mechanism at temperatures at or below the freezing point and especially during wet weather, as well as a wet lifting mechanism. In particular, when moving parts of the lifting mechanism, such as joints, movable struts, bellows or the like freeze up, a trouble-free activation of the lifting mechanism may be restricted or even prevented. This may significantly restrict the efficiency during the inductive charging of an energy store of a motor vehicle or even make the charging process itself impossible under certain conditions, since the primary coil can no longer be moved into the charging position in which a gap between the primary coil and the secondary coil is as small as possible when the lifting mechanism is iced up.

SUMMARY

The object of the present invention is to provide a charging device as well as a method for operating a charging device by means of which a reliable inductive charging of an electrical energy store of a motor vehicle can be assured even during winter weather conditions.

This object is achieved by a charging device as well as by a method for operating a charging device with the features of the independent patent claims. Advantageous embodiments with expedient and nontrivial enhancements of the invention are indicated in the dependent claims.

The charging device according to the invention for inductively charging an electrical energy store of a motor vehicle comprises a primary coil, which is designed to inducing a voltage in a secondary coil of the motor vehicle for the charging of the electrical energy store. The charging device furthermore comprises a lifting mechanism which is designed to move the primary coil between a stowage position and a charging position. In order to ensure a reliable and especially weather-independent functioning of the lifting mechanism of the charging device, it is provided according to the invention that a power electronics of the heating device is coupled in heat-conducting manner to the lifting mechanism. In this case, the power electronics may comprise the most diverse of components and circuits, especially in order to operate the primary coil of the charging device. The components may be, for example, rectifiers or also components serving for switching the primary coil on and off. Furthermore, the power electronics may also serve for operating a drive unit of the lifting mechanism.

Because the power electronics of the charging device is coupled in heat-conducting manner to the lifting mechanism, the waste heat of the power electronics can be used to prevent an icing of the lifting mechanism. In particular, moving parts and parts of the lifting mechanism able to move relative to each other can also be kept reliably ice-free in this way, even during unfavorable weather conditions, i.e., at temperatures at or below the freezing point and relatively high humidity, and also when the lifting mechanism is wet. Thus, the charging device can also be used reliably during winter conditions, since the lifting mechanism can be kept ice-free and thus functional on account of the waste heat that can be supplied by the power electronics.

Another advantageous embodiment of the invention calls for the charging device to have a heating unit, which is coupled in heat-conducting manner to the lifting mechanism. This brings the advantage that the lifting mechanism can also be reliably heated or warmed when the power electronics is not even operating. Thus, the heating unit can be activated and deactivated as needed, so that the lifting mechanism can be maintained ice-free and thus functional.

Another advantageous embodiment of the invention calls for the power electronics and/or the heating unit being arranged on an aluminum plate, on which the lifting mechanism is arranged. Preferably, the aluminum plate is a kind of bottom plate of the charging device, which can be designed, for example, as a housing part of the charging device due to positively acting properties on the magnetic field of the charging device, and which closes off the charging device at the bottom in the vertical direction. Since an aluminum plate is a very good heat conductor, the waste heat from the power electronics or the heat provided by the heating unit can be especially easily supplied to and discharged from the region of the lifting mechanism.

According to an alternative advantageous embodiment of the invention, it is provided that the power electronics and/or the heating unit are arranged on an aluminum plate, which is arranged on a second aluminum plate, on which the lifting mechanism is arranged. Instead of the second aluminum plate, one may also use a second plate of another material with a high coefficient of thermal conductivity. For example, the power electronics and/or the heating unit may be arranged in a separate housing, whose bottom region is formed by the first aluminum plate. The lifting mechanism in turn may be arranged, for example, in a receiving space whose bottom region is formed by the second aluminum plate. The two aluminum plates lie against one another at least in regions, so that a thermal conduction from the first aluminum plate to the second aluminum plate can be assured. Waste heat dissipated from the power electronics across the first aluminum plate is thus passed on to the second aluminum plate, on which the lifting mechanism is arranged. The same applies to the heating unit, where the heat provided by the heating unit is likewise dissipated by way of the first aluminum plate and supplied to the second aluminum plate, on which the lifting mechanism is arranged. Also, in this advantageous embodiment of the invention, a reliable functioning of the lifting mechanism can also be assured even during winter weather conditions, since an icing of the lifting mechanism can be prevented by the waste heat provided by the power electronics and/or by the heat provided by the heating unit.

According to another advantageous embodiment of the invention, it is provided that the charging device has a control unit, which is designed to operate the heating unit as a function of weather data which is provided. For example, the charging device may have a sensor unit for detecting the temperature and the humidity, wherein the control unit receives the data from the sensor unit characterizing the temperature and humidity and operates the heating unit as a function thereof. Alternatively or additionally, it may also be provided that the charging device has a communication unit, by means of which data on the temperature and/or humidity can be received, and this data is provided in turn to the control unit, which operates the heating unit as a function of the data provided. In particular, if both the sensor unit and the mentioned communication unit are provided, the redundant providing of data on the temperature and the humidity can make possible an especially reliable functioning of the charging device, since corresponding weather data can be provided at all times, and a heating of the lifting mechanism can be produced as a function thereof. An icing of the lifting mechanism and especially an icing of moving parts or parts of the lifting mechanism which can move relative to each other can thus be safely prevented.

In another advantageous embodiment of the invention, it is provided that the control unit is adapted to activate the heating unit for a predetermined time before an upcoming charging process. For example, vehicle-specific information may be exchanged via a communication system with the charging device. When a motor vehicle is in the vicinity of the charging device or approaches the charging device, the control unit can receive a corresponding signal. In this case, it is likely that a charging process for the particular motor vehicle, more precisely the electrical energy store of the particular motor vehicle, will soon take place by means of the charging device. Even before the actual charging process begins, the heating unit will be actuated by means of the control unit, so that the possibly already iced or partly iced lifting mechanism is de-iced. It may thus be assured that an upcoming charging process can in any case be performed with no problem.

Another advantageous embodiment of the invention calls for the control unit to be designed to activate the heating unit if a force is exerted to move the lifting mechanism, which is greater than a predetermined force value. For example, it may be provided that the control unit is connected to an electric motor, by means of which the lifting mechanism can be moved. In this way, the control unit can pick off information or data characterizing the force expended or required to directly move the lifting mechanism. The predetermined force value will be greater in this case than a force normally exerted to move the non-frosted lifting mechanism. But if a force is expended during the movement of the lifting mechanism, which is greater than the predetermined force value, this might be an indication that the lifting mechanism is at least partly iced and therefore less easily moved than usual. Thus, it will be detected not later than when the lifting mechanism is moved whether or not the latter is iced. For this situation, the control unit is designed to activate the heating unit so that the lifting mechanism is de-iced as fast as possible and a reliable charging process can be assured by means of the charging device.

Another advantageous embodiment of the invention calls for the control unit being designed to activate the heating unit if a charging current falls below a predetermined charging current value during the charging of an electrical energy store of a motor vehicle. One cause of this might be that the lifting mechanism could not be moved completely from the stowage position to the final charging position, for example, because the lifting mechanism is iced. For such a situation, the control unit is designed to activate the heating unit so that the possibly iced lifting mechanism can be de-iced as fast as possible. In this way, the lifting mechanism can be moved relatively promptly into the desired or nominal charging position and an especially efficient charging process can be assured.

Another advantageous embodiment of the invention calls for the control unit being designed to activate and deactivate the heating unit at predetermined cyclical intervals. In this way, it can be assured, without a major expense for measurement and control, that the lifting mechanism is kept ice-free. The aforementioned ways of operating the control unit for the operating of the heating unit can also be combined with each other.

In the method according to the invention for the operating of the charging device according to the invention or an advantageous embodiment of the charging device according to the invention, the lifting mechanism is heated by means of the waste heat of the power electronics. Advantageous embodiments of the charging device according to the invention are also considered to be advantageous embodiments of the method according to the invention, wherein the charging device in particular comprises means of carrying out the steps of the method.

Further advantages, features and details of the invention will emerge from the following description of preferred exemplary embodiments, as well as based on the drawing(s). The features and combinations of features mentioned above in the description as well as the features and combinations of features named below in the description of the figure(s), and/or features and combinations of features shown solely in the figure(s), may be used not only in the particular indicated combination, but also in other combinations or standing alone, without leaving the scope of the invention.

BRIEF DESCRIPTION OF THE DRAWING

FIG. 1 shows a charging device for inductively charging an electrical energy store of a motor vehicle in a schematic side view, wherein the charging device comprises a lifting mechanism that is designed for the purpose of moving a primary coil of the charging device between a stowage position and a charging position.

DETAILED DESCRIPTION OF THE INVENTION

A charging device 10 for inductively charging an electrical energy store of a motor vehicle, not shown here, comprises a primary coil 12, which is designed for the purpose of inducing a voltage in a secondary coil of a motor vehicle, not shown here, for the charging of the respective electrical energy store. In order to achieve an especially high efficiency in the charging process, it is important for the distance between the primary coil 12 and the secondary coil to be as small as possible. Therefore, the charging device 10 further comprises a lifting mechanism 14, which is designed for the purpose of moving the primary coil 12 in the height direction z of the charging device 10, i.e., the vertical direction, between the stowage position shown here and an extended charging position. Thus, by means of the lifting mechanism 14, it is possible to move the primary coil 12 closer to a secondary coil of the motor vehicle whose electrical energy store is to be inductively charged.

The lifting mechanism 14 may, for example, be designed as a scissors lift, as shown here schematically. But other configurations or principles of action of the lifting mechanism 14 are likewise possible. The charging device 10 comprises a drive 16 by means of which the lifting mechanism 14 can be moved back and forth between the stowage position shown here and the charging position extended in the height direction z. The lifting mechanism 14 comprises several moving parts, such as, for example, joints, struts, and the like, not characterized in detail here. Especially during winter weather conditions, i.e., temperatures at or below the freezing point and with relatively high humidity, the danger exists, among other things, that the components which can move relative to each other or moving components of the lifting mechanism 14 will freeze and thus a reliable functioning of the lifting mechanism 14 will be endangered.

In order to enable a reliable functioning of the lifting mechanism 14 even during winter weather conditions, i.e., to prevent a freezing of the lifting mechanism 14 or to enable a de-icing of the lifting mechanism 14, a power electronics 18 of the charging device 10 and a heating unit 20 of the charging device 10 are coupled in heat-conducting manner to the lifting mechanism 14. In the case presently illustrated, both the lifting mechanism 14 as well as the power electronics 18 and the heating unit 20 are arranged on the same aluminum plate 22. The aluminum plate 22 serves here as the bottom plate of the charging device 10 and is formed as a housing piece due to properties that act positively on the magnetic field of the charging device 10 generated during the charging process. Since the aluminum plate 22 is a good thermal conductor, the waste heat of the power electronics 18 and the heat generated by the heating unit 20 can be transmitted especially easily across the aluminum plate 22 to the lifting mechanism 14.

During charging processes, the power electronics 18 necessarily develops a certain amount of heat, which can be dissipated across the aluminum plate 22 to the lifting mechanism 14. At low temperatures and high humidity—i.e., when a danger of icing of the lifting mechanism 14 exists—an icing of the lifting mechanism 14 is prevented and/or iced components of the lifting mechanism 14 are de-iced by the waste heat furnished by the power electronics 18 to the lifting mechanism 14.

In the event that no charging process is taking place and thus neither is the power electronics 18 producing any waste heat, the heating unit 20 can be activated so that heat provided by the heating unit 20 is transmitted by way of the aluminum plate 22 to the lifting mechanism 14. Depending on the weather conditions, however, it may also be provided that the heating unit 20 is operated additionally during the charging process and thus during the output of heat by the power electronics 18, in order to make possible an especially high heating capacity and thus heating of the lifting mechanism 14.

The charging device 10 furthermore comprises a control unit 24, which is designed to actuate the heating unit 20. Furthermore, the charging device 10 also comprises a sensor unit 26 for detecting the temperature and humidity. Alternatively or additionally, the charging device 10 can also have a communication unit, not represented here, by means of which online weather data can be received, for example.

The control unit 24 is designed to operate the heating unit 20 as a function of the weather data provided by the sensor unit 26 and/or the mentioned communication unit. For example, it may be provided that a limit temperature of, for example, 2 degrees, 1 degree, or 0 degrees is set, and the heating unit 20 is automatically activated by means of the control unit 24 as soon as the temperature in the region of the charging device 10 should fall below this limit temperature. Moreover, it may also be provided that the control unit 24 then activates the heating unit 20 when the measured humidity in the region of the charging device 10 is higher than a predetermined threshold value and the temperature in the region of the charging device 10 is below said limit temperature.

The control unit 24 may furthermore be designed to activate the heating unit 20 for a predetermined time before an upcoming charging process. By a communication system, not designated in detail, the charging device 10 may, for example, be in communication with other motor vehicles being charged. For example, if one motor vehicle should approach the charging device 10 or be situated in the immediate vicinity, the control unit 24 may activate the heating unit 20 as a precaution, so that the charging device 10 and especially the lifting mechanism 14 is functional and ice-free. For example, the control unit 24 may be designed to activate the heating unit 20 five minutes or even ten minutes or even a few seconds before an assumed upcoming charging process. This predetermined time by which the heating unit is activated before an assumed upcoming charging process may be dictated in advance, for example, as a function of the heating capacity of the heating unit 20 and/or the detected ambient weather conditions of the charging device 10.

Moreover, the control unit 24 may also be designed to activate the heating unit 20 if a force, which is greater than a predetermined force value, is exerted to move the lifting mechanism 14. The predetermined force value will preferably be chosen greater than a force normally needed to move the ice-free lifting mechanism 14. Thus, if upon activating the lifting mechanism 14 to move the primary coil 12 from the stowage position to the charging position, a force, which is greater than the predetermined force value, is expended by means of the drive unit 16, this might be an indication that the lifting mechanism 14 is iced. As a result, the control unit 24 actuates the heating unit and activates the latter. If, now, during the heating of the lifting mechanism 14, it is detected that the force expended for the further movement of the lifting mechanism 14 is once more less than the predetermined force value, the control unit 24, as needed, may deactivate the heating unit 20 once more or at least continue to operate it only for a short time, such as one minute or so.

Furthermore, the control unit 24 may be designed to activate the heating unit 20, if a charging current during the charging of an electrical energy store of a motor vehicle should fall below a predetermined charging current value. This might be an indication that the lifting mechanism 14 could not be moved entirely to the charging position, for example, because certain moving parts or relatively movable components of the lifting mechanism 14 are iced up. For if the gap between the primary coil 12 and the respective secondary coil of the motor vehicle being charged should become too large, a reduced charging current will be established during the charging of the respective energy store of the motor vehicle. In such a situation, it may be provided that the heating unit 20 will be activated by the control unit 24 in order to make possible, if needed, a complete extension of the lifting mechanism 14 to the charging position.

Furthermore, it may also be provided that the control unit 24 is designed to activate and deactivate the heating unit 20 at predetermined cyclical intervals. This may also be done, for example, dependent on the weather, i.e., when subzero temperatures are present and an elevated humidity is measured. Thanks to the cyclical activating and deactivating of the heating unit 20, it can be assured constantly that the lifting mechanism 14 is not iced up and thus the charging device 10 can be maintained constantly functional, even at frost temperatures.

The invention claimed is:

1. A charging device for inductively charging an electrical energy store of a motor vehicle, comprising;
   a primary coil, which is designed for inducing a voltage in a secondary coil of the motor vehicle for charging the electrical energy store;
   a lifting mechanism which is designed for moving the primary coil between a stowage position and a charging position; a heating unit; and
   a heat-conductive baseplate, wherein a power electronics of the charging device, the heating unit, and the lifting mechanism are all each arranged on the heat-conductive baseplate,
   wherein the power electronics and the heating unit are coupled in a heat-conducting manner through the heat-conductive baseplate to the lifting mechanism,
   wherein the charging device includes a control unit which receives a signal indicating a specific motor vehicle is approaching the charging device and receives weather data detected by a sensor unit proximate to the charging device,
   wherein the control unit activates the heating unit a predetermined time before an arrival of the specific motor vehicle if:
      a level of humidity measured by the sensor unit is higher than a predetermined threshold value; and
      a temperature measured by the sensor unit is lower than a limit temperature.

2. The charging device according to claim 1, wherein the heat-conductive baseplate is formed from aluminum.

3. The charging device according to claim 1, wherein the power electronics and the heating unit are arranged on a first aluminum plate, which is arranged on a second aluminum plate, on which the lifting mechanism is arranged.

4. The charging device according to claim 1, wherein the control unit is designed to activate the heating unit if a force, which is larger than a predetermined force value, is exerted to move the lifting mechanism.

5. The charging device according to claim 1, wherein the control unit is designed to activate the heating unit if a charging current falls below a predetermined charging current value during the charging of an electrical energy store of a motor vehicle.

6. The charging device according to claim 1, wherein the control unit is designed to activate and deactivate the heating unit at predetermined cyclical intervals.

7. A method for operating a charging device according to claim 1, in which the lifting mechanism is heated by the waste heat of the power electronics.

* * * * *